United States Patent [19]

Salyer et al.

[11] Patent Number: 4,594,368

[45] Date of Patent: Jun. 10, 1986

[54] PHENOL-FORMALDEHYDE INTUMESCENT COATING COMPOSITION AND COATING PREPARED THEREFROM

[75] Inventors: Ival O. Salyer, Dayton; Bernard L. Fox, Centerville, both of Ohio

[73] Assignee: University of Dayton, Dayton, Ohio

[21] Appl. No.: 625,179

[22] Filed: Jun. 27, 1984

Related U.S. Application Data

[63] Continuation of Ser. No. 391,044, Jun. 22, 1982, abandoned.

[51] Int. Cl.[4] .......................... C09K 3/28; C08N 9/32
[52] U.S. Cl. .......................... 523/179; 260/DIG. 26; 428/524; 428/921; 521/54; 521/86; 521/89; 521/91; 521/92; 521/181; 521/907
[58] Field of Search ............... 521/181, 122; 523/179, 523/219; 427/224, 373; 428/524, 921

[56] References Cited

U.S. PATENT DOCUMENTS

| | | | |
|---|---|---|---|
| 3,320,087 | 5/1967 | Erickson | 428/524 |
| 3,813,356 | 5/1974 | Lievremont | 521/181 |
| 3,951,885 | 4/1976 | Thompson | 521/181 |
| 4,070,311 | 1/1978 | Cominassi et al. | 521/181 |
| 4,207,400 | 6/1980 | Dahms | 521/181 |
| 4,207,401 | 6/1980 | Dahms | 521/181 |

*Primary Examiner*—Morton Foelak
*Attorney, Agent, or Firm*—Biebel, French & Nauman

[57] ABSTRACT

Intumescent coatings which form a thick, uniform, fine celled, low density foam upon exposure to a high intensity heat flux or flame are disclosed, the invention coatings comprise phenolic resin prepolymer containing a blowing agent and a nucleating agent; in the preferred embodiments the coatings also contains a silicone surfactant, the coatings are useful in thermal and fire protection systems.

33 Claims, No Drawings ent of the National Aeronautics and Space Act of 1958 (72 Stat. 435; 42 USC 2457).

CROSS REFERENCE TO RELATED APPLICATION

This application is a continuation of U.S. application Ser. No. 391,044, filed June 22, 1982, which is abandoned.

BACKGROUND OF THE INVENTION

The present invention relates to intumescent coatings and, more particularly, to intumescent coatings capable of forming a thick, fine celled, low density foams from a phenol-formaldehyde prepolymer, a blowing agent, and a nucleating agent.

Intumescent coatings are fire retardant coatings which foam (intumesce) and char when exposed to high temperatures and/or flame. Some typical examples of prior coatings are described in U.S. Pat. No. 3,955,987 of 1976 to Schaar and U.S. Pat. No. 4,065,394 of 1977 to Pratt et al. Schaar discloses an intumescent composition comprising monoammonium phosphate, diammonium phosphate, or mixtures thereof; cyanoguanidine, urea or mixtures thereof; sucrose or sucrose and hexanehexol; and titanium dioxide as a heat reflecting agent. Pratt et al discloses an intumescent coating formed from a silicone resin base to which is added an intumescent fire retardant mixture including an oxide of iron and a phosphate of potassium to provide the material with crusting upon exposure to fire; a charring material such as tripentaerythritol and a foaming or blowing agent such as melamine. The Pratt et al coating is adapted for application to metallic surfaces such as aluminum.

Previous intumescent coatings have suffered from one or more disadvantages which have limited their usefulness. For example, in some cases they are excessively heavy and not advantageous for use in air- and spacecraft. Some coatings simply do not provide sufficient thermal protection and others give off noxious smoke and fumes as they char. Still other coatings are difficult to apply to irregular surfaces. In the case of the Schaar coating, this coating is designed to be removed with water and, as such, it is not useful in out-of-doors applications or in applications in which the coating may be exposed to high humidity. Still other coatings spall and ablate away under fire conditions.

Thus, there is a need for intumescent coatings which overcome the limitations of prior coatings. More particularly, there is a need for coatings which can be readily cast from solution which do not smoke or give off toxic fumes upon exposure to intense heat and flames, and which are relatively water-resistant.

SUMMARY OF THE INVENTION

A principal object of the present invention is to satisfy the aforementioned need and, more particularly, to provide intumescent coatings which are relatively water-resistant, which do not spall or ablate upon exposure to intense heat or flame, and which form a thick, fine celled, low density foam.

A more particular object of the present invention is to provide an intumescent coating from a phenol-formaldehyde prepolymer.

These and other objects are attained in accordance with the present invention wherein in one embodiment of the invention an intumescent coating is provided comprising a phenol-formaldehyde prepolymer, a blowing agent, and a nucleating agent wherein the blowing agent and the nucleating agent are present in amounts such that under intense heat conditions such as a heat flux of 8 BTU/sec/ft$^2$, the coating intumesceses and forms a thick, fine celled, thermosetting foam.

In a preferred embodiment of the invention, the coating additionally includes a surfactant as a nucleation assistant.

The intumescent coatings of the present invention are designed such that upon exposure to an intense heat flux or flame the prepolymer in the coatings polymerizes and cross-links as it foams to produce a flame-resistant, highly insulative self-supporting foam. In accordance with the present invention, highly effective intumescent coatings have been obtained from phenol-formaldehyde prepolymers by the addition of blowing agents and nucleating agents to the prepolymer. These compositions are able to provide a thick, highly insulative, fine celled foam in the presence of intense heat and/or flames. In the preferred embodiments of the invention, the coatings produce foams made up of cells ranging up to $\frac{1}{4}$ inch in diameter, the surfaces of which char and graphitize upon heating and are thereby converted to flame-resistant barriers. Depending on the initial coating thickness, in accordance with the present invention, backside surface temperatures, i.e., temperatures on the surface of the foam opposite the incident flame or thermal flux can be maintained below 400° F. (204° C.) for time periods ranging from 15 to 45 minutes under a flame temperature of approximately 1,000° F. (537° C.) and a heat flux of 8 BTU/sec/ft$^2$.

The invention coatings are also advantageous because they can be applied to irregular surfaces from solution and are relatively water-resistant. In accordance with the present invention, coating compositions are prepared by dissolving a phenol-formaldehyde prepolymer in a suitable solvent and adding thereto the blowing and nucleating agents. Depending on whether the blowing agent is a solid or liquid type blowing agent, the blowing agent may be dissolved or dispersed in the coating composition. A tenacious, continuous film can be formed on various surfaces including metal by forming successive coats followed by solvent evaporation.

The invention coatings are suitable for a wide variety of applications and are useful in rendering substantially any adherent substrate heat and/or flame resistant. For example, the invention coatings can be applied to the other housings of weapons such as bombs and missiles, to prevent the weapons from cooking off in the event of fire. They can also be used in aircraft fire walls to protect pilot, passengers and critical control cables. The invention coatings can be applied to containers carrying flammable materials such as solvent drums to protect them in the event of fire. The invention coatings can also be used in combination with other thermal protection or fire retardant systems such as pre-formed foams to enhance their protective characteristics. They can also be advantageously used in the walls of buildings such as hospitals and nursing homes to isolate or slow the advance of fire.

DETAILED DESCRIPTION OF THE INVENTION

The intumescent coatings of the present invention comprise a phenol-formaldehyde prepolymer, a blowing agent and a nucleating agent. In a preferred embodiment of the invention, the coatings additionally include a surfactant as a nucleation assistant.

The phenol-formaldehyde prepolymers used in the present invention are resins formed by reacting phenol with formaldehyde and stopping the reaction while the polymer chains are short and little or no cross-linking has occurred. A commercially available "B"-stage phenolic resin can be used in the present invention. Representative examples include the Resinox phenolic resins available from Monsanto Company and, in particular, Resinox 736. The degree of polymerization, viscosity, and solubility of the prepolymer are important considerations in its selection. The prepolymer must be sufficiently soluble in order to enable a prepolymer film to be cast from solution. It has been found that melt cast films tend to crack upon heating and, therefore, do not provide maximum protection. The phenol-formaldehyde prepolymers used in the present invention are typically soluble in such solvents as acetone and dichloromethane.

In addition, the prepolymer cannot be polymerized and cross-linked to such an extent that foam formation cannot occur upon heating. In accordance with the present invention, the intumescent coating foams as the prepolymer polymerizes and cross-links. If the prepolymer is nearly fully polymerized or polymerized to a stage where it is highly viscous even upon heating, the coating is too rigid and viscous for adequate foam formation and thin, poorly insulative foams or no foam at all are obtained. As a general rule, phenolic prepolymers which provide a viscosity of approximately 10 cps to 1000 cps in a 10% acetone solution at 25° C. are useful in the present invention.

Coating compositions are formed by dissolving the phenolic prepolymer in a suitable solvent. The phenolic prepolymer is usually obtained in the form of a powder. Phenolic prepolymers are highly soluble in solvents such as acetone and dichloromethane and these solvents are useful in the present invention. However, other solvents which are non-toxic and, preferably, non-flammable may be preferred to these. In particular, due to the difficulty in completely removing the solvent from the intumescent coating, non-flammable solvents such as dichloromethane and trichloromonoflorome-thane and perchloromethane are desirable. If the solvent used is flammable, it will lessen with the thermal and flame resistant qualities of the invention coatings, if it is not completely removed. Due to the difficulty and the substantial amounts of time required to completely remove a solvent from a coating, non-flammable solvents such as trichloromonofluoromethane are desirable. However, where the coating can be thoroughly dried, for example, where prefabricated substrates coated with the composition can be passed through a suitable drying oven, it is feasible to use flammable solvents in forming the coating.

The concentration of the prepolymer in the coating composition is a matter of choice considering manufacturing ease. In general, suitable films can be prepared from coating compositions containing from approximately 10% to 60 wt% prepolymer.

In accordance with the present invention, it has been found that the water released upon polymerization of the phenolic prepolymer is insufficient to completely foam the polymer and produce a thick, highly insulative foam material. Hence, in accordance with the present invention, a blowing agent is added to the prepolymer composition. Solid, thermally decomposable blowing agents are preferred, but liquid blowing agents which are volatile under intense heat may be used in some instances. Thermally decomposable blowing agents are desirable because they can be selected such that the release of the blowing agent is synchronized with the heat-induced polymerization of the prepolymer. One of the drawbacks of blowing agents such as volatile solvents is that upon heat-exposure, the solvent may vaporize too rapidly and may be unavailable or not available in sufficient quantities for optimum foam formation when the polymerization reaction occurs.

Some typical examples of useful blowing agents include azobisisobutyronitrile (AIBN), 1,1-azobisformamide (e.g., Kempore 200, a product of Stepan Chemical Co.), 4,4'-oxybis(benzene sulfonhydrazide, e.g., Nitropore OBSH, Stepan Chemical Co.), dinitrosopentamethylene tetraamine (e.g., Opex 93, Stepan Chemical Co.) etc. In accordance with a preferred embodiment of the invention, a combination of cyanoguanidine and magnesium chloride hexahydrate is used as the blowing agent.

The amount of the blowing agent used in the intumescent coatings of the present invention will depend on the nature of the blowing agent. Preferred amounts can be determined empirically on a case-by-case basis to provide a thick uniform, fine celled foam. Volatile agents are generally used in higher amounts to compensate for their evaporation. Solid, thermally decomposable blowing agents such as cyanoguanidine are generally used in an amount of approximately 1 to 10 weight percent based on the phenolic resin. When cyanoguanidine and magnesium chloride hexahydrate are used in combination, they are generally used in a weight ratio of cyanoguanidine to magnesium chloride hexahydrate of about 10/1 to 1/10.

It has also been found necessary to incorporate a nucleating agent into the intumescent coating to achieve a fine celled, low-density foam. If a nucleating agent is not present, large cells, irregularly distributed throughout the foam may form. Various known nucleating agencts can be used in the present invention including glass microballoons and pigments such as $TiO_2$, ZnO, etc. The function of the nucleating agent is to provide a surface upon which the gas generated by the blowing agent and the polymerization reaction may accumulate and form fine cells. Preferred nucleating agents for use in the present invention comprise 0.1 to 5 micron pigments (e.g. $TiO_2$) and glass microballoons up to 1000 microns in particle size. Since there is a tendency for some nucleating agents such as $TiO_2$, to settle from the coating composition and, likewise, there is a tendency for other nucleating agents such as glass microballoons to float, it is desirable to use a combination of nucleating agents in the intumescent composition such as a combination of $TiO_2$ and glass microballoons. The glass microballoons that have been found to be particularly desirable for use in the present invention are Al6/5000 [CHECK TRADE NAME] microballoons manufactured by Minnesota Mining and Manufacturing, Inc.

The preferred amount of the nucleating agent can be determined empirically so as to provide a fine celled foam in the presence of intense heat or flame. As guidelines, $TiO_2$ is used in the preferred compositions of the present invention in an amount of approximately 10 to 50 mg/g prepolymer in combination with glass microballoons in an amount of approximately 5 to 25 mg/g resin. In the preferred case, the foams generated in situ upon heating the coatings of the present invention are essentially made up of cells not larger than approximately ¼ inch and preferably range from approximately ⅛ inch and smaller. Furthermore, preferably the foams formed have densities of about 1 1 to 2 lbs/cu.ft. or less. Naturally the density of the foam should not be so low that it is not self-supporting, i.e., less than about 0.25 lbs/cu.ft.

To further assist in the formation of a fine celled, highly insulative, low density foam in the presence of intense heat, a surfactant is incorporated into the coating compositions of the present invention. The surfactant may be an anionic or non-ionic surfactant, however, non-ionic surfactants are preferred. In particular, the surfactants which are most preferred for use in the present invention are silicone surfactants such as Union Carbide's L-540 surfactant. In general, the surfactant is used in an amount up to approximately 10% by weight of the resin. However a concentration in the range of oil to 1% is usually preferred.

The invention coatings are cast from solution by, for example, brushing or spraying a substrate with the coating composition and evaporating the solvent. The coatings usually range from approximately 5 to 45 mils in thickness. As the thickness of the coating increases, the thickness of the foam generated by the coating and its insulative effect increases. Coatings ranging from approximately 15 to 25 mils are suitable for most applications. The coating will adhere to various substrates including metallic substrates such as sheet metal and cellulosic substrates such as paper covered dry wall, paper board, etc.

While the invention coating is relatively water-resistant, in some applications it may be desirable to provide the coating with a water-impermeable topcoat. Polyvinylidene chloride polymers are among the most water-impermeable materials and, because of their high halogen content, are resistant to burning. Solvent applied polyvinylidene chloride topcoats are preferred to those applied from a laytex because the latter tend to crack upon drying. In addition to polyvinylidene chloride, other non-flammable, water-impermeable coatings may be used.

The invention coating may be applied directly to the substrate it is desired to protect, or the coating may be used in combination with other fire-retardant and thermal protection systems. In one embodiment of the invention, the intumescent coating is applied to the surface of a fire-retardant, thermally protective, preformed foam such as a polyisocyanurate foam.

The invention will become more clear from the following example. Unless otherwise indicated, all parts and percents are by weight.

EXAMPLE

An intumescent coating composition was prepared by dissolving Resinox 736 (a powdered phenolic resin available from Monsanto Company) in acetone in a concentration of 1.1 g/ml. To the solution were added rutile $TiO_2$ and glass microballoons (A16/5000, available from 3M) at a rate of 29.3 mg/ml and 14.7 mg/ml, respectively. The blowing agent and surfactant indicated in the Table below were added to the composition in an amount of 0.1 g/ml blowing agent and 0.01 g/ml surfactant.

The coating compositions so prepared were applied to a stainless steel test plate measuring 2½ inch×3 inch×1/16 inch in the thicknesses indicated in the Table to which a chromel-alumel thermocouple was welded at the center of the backside. The thermal and flame resistant properties of the coatings were tested by holding the plates in a horizontal position in direct contact with a vertically downwardly directed flame. The plates were rested on a support of polyimide foam insulation to prevent flame wrap around to the back of the plate. An outer cylindrical shield of galvanized steel flue pipe 6 inches in diameter and 15 inches in length was placed around the flame and the sample. A second, Pyrex glass tube 3.5 inches in diameter and 9.5 inches in length was placed around the flame with the head of the burner extending 3 inches into the tube.

For the tests, air and natural gas were metered to a "Super Blowpipe" Model 2-N hand torch (American Gas Furnace Co., Elizabeth, N.J.) to provide a heat flux which was determined to be 8 $BTU/sec/ft^2$ at a distance 6 inches from the burner.

With the shields in place, using a 10 mv recorder, the thermocouple output from the plate was recorded and the time to 400° F. was determined. The results are shown in the table.

TABLE

| Blowing Agent | L-540 Surfactant | Film Thickness (mils)[1] | Time to 400° F. (min) | sec per mil (spm) |
|---|---|---|---|---|
| None | None | 16 | 0.45 | 1.7 |
| None | Yes | 16 | 1.9 | 7.1 |
| AIBN | Yes | 43 | 7.2 | 10.0 (8.9)[2] |
| Kempore 125 | Yes | 28 | 6.7 | 14.4 |
| Kempore 200 | Yes | 43 | 5.6 | 7.8 |
| Opex 93 | Yes | 24 | 2.0 | 5.0 |
| Nitropure OBSH | Yes | 28 | 1.3 | 2.8 |

[1]Irregular films; thickness difficult to measure.
[2]Average of six experiments Typical phenolic odors evolved when these films were heated. The odors were not objectionably strong and no smoke was produced. The resultant films adhered well to the test plates and no tendency was observed for the film to drop or slip during the tests. A major factor contributing to the variation in spm values is the variability of the dried film density. The spm values for formulations containing AIBN were reasonably consistent (5.2–12.0 sec/mil). The results given for the other agents in the table are observations for single experiments.

Having described the invention in detail and by reference to preferred embodiments thereof, it will be apparent that numerous variations and modifications are possible without departing from the spirit and scope of the following claims.

What is claimed is:

1. An intumescent coating consisting essentially of phenol-formaldehyde prepolymer, a blowing agent, and a nucleating agent dispersed in said prepolymer, said prepolymer being soluble in acetone and dichloromethane in an amount greater than 10 percent by weight and being solid at room temperature (23° C.), and said coating being characterized in that it is unfoamed in its coated condition and it is foamable in situ to a flame and heat resistant foam upon exposure to intense heat flux or flame.

2. The intumescent coating of claim 1 wherein said blowing agent is a solid, thermally decomposable blowing agent.

3. The intumescent coating of claim 2 wherein said nucleating agent is selected from the group consisting of $TiO_2$, glass microballoons, and combinations thereof.

4. The intumescent coating of claim 3 wherein said coating further comprises a surfactant.

5. The intumescent coating of claim 4 wherein said surfactant is a non-ionic surfactant.

6. The intumescent coating of claim 5 wherein said surfactant is a silicone surfactant.

7. The intumescent coating of claim 6 wherein upon exposure to intense heat or flame said coating forms a foam consisting essentially of cells ranging up to ¼ inch in diameter.

8. The intumescent coating of claim 7 further comprising a water impermeable, non-flammable topcoat.

9. A flame-resistant substrate having an intumescent coating on the surface thereof, said coating consisting essentially of a phenol-formaldehyde prepolymer, a blowing agent, and a nucleating agent dispersed in said prepolymer, said prepolymer being soluble in acetone and dichloromethane in an amount greater than 10 percent by weight and being solid at room temperature (23° C.), and said coating being characterized in that it is unfoamed in its coated condition and is foamable in situ to a flame and heat resistant foam upon exposure to intense heat flux or flame.

10. The substrate of claim 9 wherein said blowing agent is a solid, thermally decomposable blowing agent.

11. The substrate of claim 10 wherein said nucleating agent is selected from the group consisting of $TiO_2$, glass microballoons and combinations thereof.

12. The substrate of claim 11 wherein said coating additionally comprises a surfactant.

13. An intumescent coating composition consisting essentially of a phenol-formaldehyde prepolymer, a solvent for said prepolymer, a blowing agent and a nucleating agent dispersed in said prepolymer, said prepolymer being soluble in acetone and dichloromethane in an amount greater than 10 percent by weight and being solid at room temperature (23° C.), and said composition being characterized in that when it is coated upon a substrate and said solvent is evaporated, it forms an unfoamed coating which is foamable in situ to a flame and heat resistant foam upon exposure to intense heat flux or flame.

14. The coating composition of claim 13 additionally comprising a surfactant.

15. The coating composition of claim 14 wherein said blowing agent is a solid, thermally decomposable blowing agent.

16. The intumescent coating of claim 3 wherein said blowing agent and said nucleating agent are used in amounts suitable for forming a fine celled, low density foam consisting essentially of cells ranging up to ¼ inch in diameter.

17. The substrate of claim 11 wherein said blowing agent and said nucleating agent are used in amounts suitable for forming a fine celled, low density foam consisting essentially of cells ranging up to ¼ inch in diameter.

18. The coating composition of claim 13 wherein said blowing agent and said nucleating agent are used in amounts suitable for forming a fine celled, low density foam consisting essentially of cells ranging up to ¼ inch in diameter.

19. The substrate of claim 9 wherein said intumescent coating is overcoated with a water-impermeable, non-flammable top coat.

20. The intumescent coating of claim 3 wherein said phenol-formaldehyde prepolymer has a viscosity of approximately 10 to 1,000 cps in 10% acetone at 25° C. and said prepolymer is present in said composition in an amount of approximately 10 to 60% by weight.

21. The intumescent coating of claim 3 wherein said $TiO_2$ has a particle size of approximately 0.1 to 5 microns and said glass microballoons have a particle size up to approximately 1,000 microns.

22. The intumescent coating of claim 21 wherein said nucleating agent comprises a combination of said $TiO_2$ and said glass microballoons.

23. The substrate of claim 10 wherein said phenol-formaldehyde prepolymer has a viscosity of about 10 to 1,000 cps in 10% acetone at 25° C. and is present in an amount of approximately 10 to 60% by weight.

24. The substrate of claim 11 wherein said $TiO_2$ has a particle size of approximately 0.1 to 5 microns and said glass microballoons have a particle size up to 1,000 microns.

25. The substrate of claim 24 wherein said nucleating agent comprises a combination of said $TiO_2$ and said glass microballoons.

26. The intumescent coating composition of claim 13 wherein said phenol-formaldehyde prepolymer has a viscosity of approximately 10 to 1,000 cps in 10% acetone at 25° C. and is present in an amount of approximately 10 to 60% by weight.

27. A process for rendering a substrate heat and fire resistant which consists essentially of coating the surface of said substrate with an intumescent coating without foaming said coating, said coating consisting essentially of a phenol-formaldehyde prepolymer, a solvent for said prepolymer, a blowing agent and a nucleating agent dispersed in said prepolymer, said prepolymer being soluble in acetone and dichloromethane in an amount greater than 10 percent by weight and being solid at room temperature (23° C.), and said coating being characterized in that it is unfoamed in its coated condition and it is foamable in situ to a heat and fire resistant foam upon exposure to intense heat flux or flame.

28. The process of claim 27 wherein said blowing agent and said nucleating agent are used in amounts suitable for forming a fine celled, low density foam consisting essentially of cells ranging up to ¼ inch in diameter.

29. The process of claim 18 wherein said phenol-formaldehyde prepolymer has a viscosity of approximately 10 to 1,000 cps in 10% acetone at 25° C.

30. The intumescent coating of claim 1 wherein said blowing agent is selected from the group consisting of azobisisobutyronitrile, 1,1-azobisformamide, 4,4'-oxybis(benzenesulfonhydrazide), dinitrosopentamethylene tetraamine, and a mixture of cyanoguanidine and magnesium chloride hexahydrate.

31. The flame-resistant substrate of claim 9 wherein said blowing agent is selected from the group consisting of azobisisobutyronitrile, 1,1-azobisformamide, 4,4'-oxybis(benzenesulfonhydrazide), dinitrosopentamethylene tetraamine, and a mixture of cyanoguanidine and magnesium chloride hexahydrate.

32. The intumescent coating composition of claim 13 wherein said blowing agent is selected from the group consisting of azobisisobutyronitrile, 1,1-azobisformamide, 4,4'-oxybis(benzenesulfonhydrazide), dinitrosopentamethylene tetraamine, and a mixture of cyanoguanidine and magnesium chloride hexahydrate.

33. The process of claim 27 wherein said blowing agent is selected from the group consisting of azobisisobutyronitrile, 1,1-azobisformamide, 4,4'-oxybis(benzenesulfonhydrazide), dinitrosopentamethylene tetraamine, and a mixture of cyanoguanidine and magnesium chloride hexahydrate.

* * * * *